United States Patent [19]
Hancock

[11] Patent Number: 6,142,171
[45] Date of Patent: Nov. 7, 2000

[54] VALVE ADAPTER

[76] Inventor: Leonard H. Hancock, 130 Shetland Dr., Hummelstown, Pa. 17036

[21] Appl. No.: 09/056,147

[22] Filed: Apr. 7, 1998

Related U.S. Application Data

[60] Provisional application No. 60/041,927, Apr. 7, 1997.

[51] Int. Cl.$^7$ .................................................. F16K 27/00
[52] U.S. Cl. ..................... 137/271; 137/454.5; 137/884
[58] Field of Search .................... 137/269, 271, 137/884, 270, 454.5, 454.6

[56] References Cited

U.S. PATENT DOCUMENTS 4,078,574  3/1978  Kosarzecki ............................ 137/269
5,794,651  8/1998  Miller ................................. 137/884 X

OTHER PUBLICATIONS

Parker Hannifin Corporation, Proportional Control Valves Series DF122, Solenoid Operated, 2–Way, N.C. or N.O., Pressure Comp. Proportional Flow Control Valves, PV6 and PV7, Copyright 1990.

Dana Corporation, Catalog No. GPA–2–120, Models QA & QD Flow Control Valves, Copyright 1990.

Fluid Controls, Spreader Valves, Single and Dual Flow Regulators, 15 pp., Copyright 1990.

*Primary Examiner*—Kevin Lee
*Attorney, Agent, or Firm*—Webb Ziesenheim Logsdon Orkin & Hanson, P.C.

[57] ABSTRACT

A method and apparatus are provided for converting a manually controlled hydraulic valve system to an electronically controlled hydraulic valve system using an adapter. The manual valves are removed from the valve block of the manual system and replaced by an electronic or electric solenoid cartridge valve through the use of an adapter to operationally connect the cartridge valve with the valve block. The cartridge valve is then attached to an electronic control system.

19 Claims, 4 Drawing Sheets

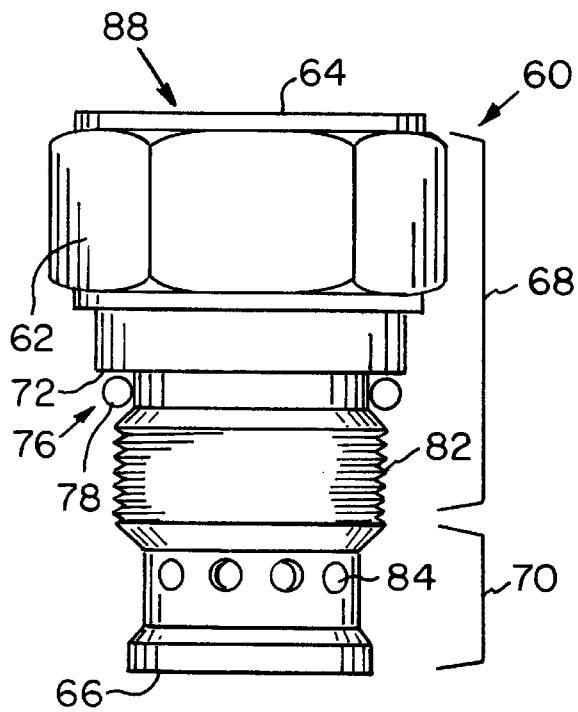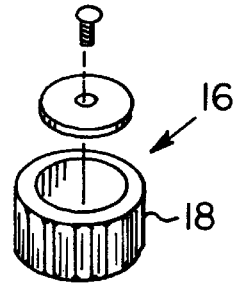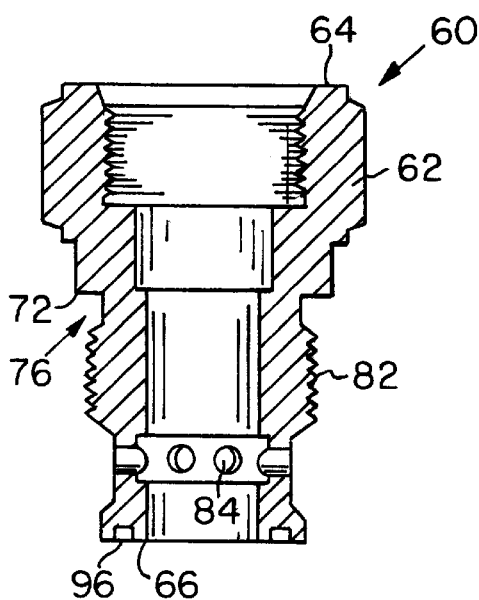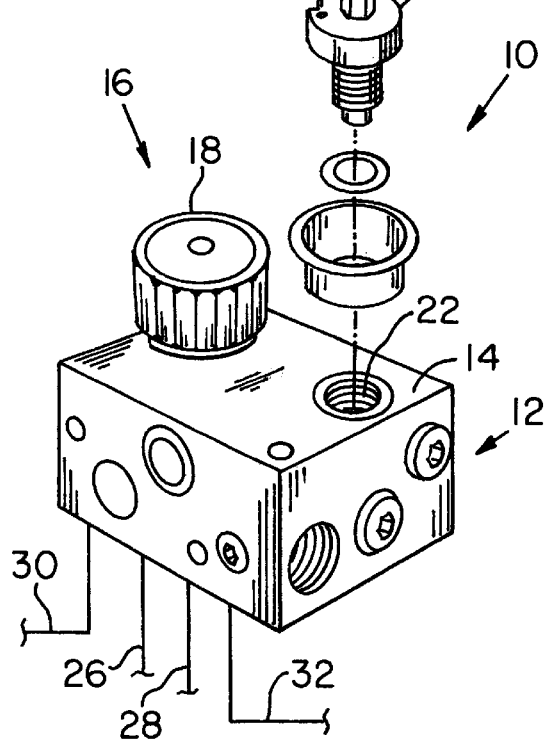

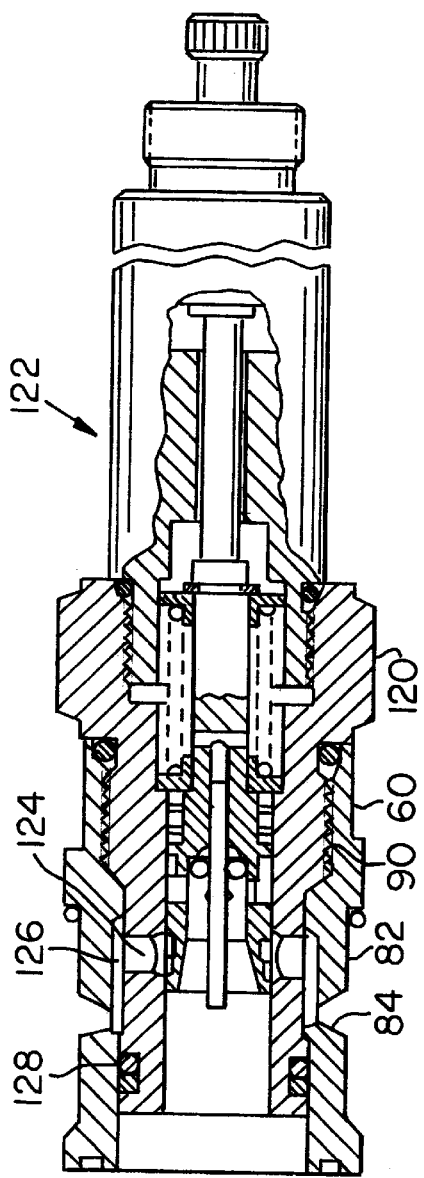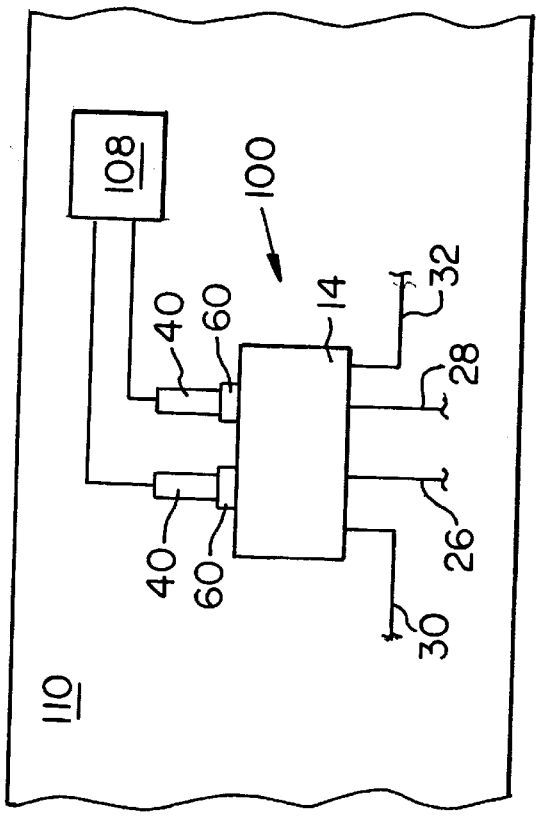
FIG. 10
FIG. 9

VALVE ADAPTER

CROSS REFERENCE TO RELATED APPLICATION

This application claims the benefit of United States Provisional Application Number 60/041,927 filed on Apr. 7, 1997 and entitled "Valve Adapter".

BACKGROUND OF THE INVENTION

1. Field of the Invention

The invention relates generally to the field of hydraulic valves and, more particularly, to a valve adapter which can be used to convert or retrofit a manually controlled hydraulic valve assembly to an electronically controlled hydraulic valve assembly.

2. Background of the Prior Art

Hydraulic valve assemblies having hydraulic control valves are used throughout the United States for various applications. One common application is for controlling the operation of the conveyor and the spinner on a cinder or salt spreader vehicle. Many different types of such spreader vehicles are known. In these spreader vehicles, the material to be spread, typically cinders or salt, are stored in a large bin or compartment on the vehicle. When material is to be spread on a road, the material is moved by a conventional conveyor, such as an auger, from the bin to the spinner, typically a rotating disc-shaped element. As the spinner rotates, the material is thrown outwardly in an arcuate path and onto the road.

In most conventional spreader vehicles, both the conveyor and the spinner are hydraulically powered. In most older spreader vehicles, a manually operated hydraulic valve system having a manually operated flow control valve is used to control the speed of the conveyor and the spinner. An example of such known manual hydraulic control valves in wide use with spreaders is the 2F series of valves, for example a Model No. 2FFL12-D6-7/15S valve, manufactured by the Fluid Controls Division of the Danfos Corporation of Easley, S.C. Another well known and widely used manual control valve in the field of spreaders is the QDB series of valves manufactured by the Mobile Fluid Products Division of the Dana Corporation of Sarasota, Fla. Both the Danfos 2F series valves and the Dana QDB series valves are manual hydraulic flow control valves and the structure and operation of these valves is well known in the spreader industry. These valves are single or dual pressure compensated flow control valves which must be manually adjusted to change the flow of hydraulic fluid through the valve assembly to adjust the speed of the conveyor or spinner.

A semi-exploded view of a Danfos 2FFL12-D6-7/15 manual control valve 10 in a manually controlled hydraulic valve system 12 is schematically shown in FIG. 1 of the drawings. The manual control valve 10 includes a valve block 14 having a pair of manual valves 16, one of which is shown in exploded view. Each manual valve 16 has a control knob 18 attached to a conventional needle valve 20. The needle valves 20 extend into threaded valve cavities 22 in the valve block 14. The valve block 14 is typically in flow communication with a hydraulic fluid source through a delivery conduit 26 and a return conduit 28. The hydraulic fluid flows through the valve block 14 and through outlet conduits 30 and 32 to the spinner and conveyor, respectively.

The manual control knobs 18 must be turned by an operator in order to adjust the flow of hydraulic fluid through the valve block 14 to increase or decrease the speed of the conveyor and spinner. However, once set, the manual control knobs 18 must then be manually readjusted in order to vary the speed of the conveyor and spinner. This manual adjustment is time consuming and inconvenient. Additionally, such manual control systems maintain the set speed of the conveyor and spinner without regard to the speed of the spreader vehicle. Therefore, if the spreader vehicle is traveling at a high rate of speed, only a thin coat of salt is placed on the road. If the spreader is traveling at a slow rate of speed, a rather thick coat of salt is placed on the road.

A growing trend in the spreader industry is to base the speed of the conveyor and spinner on the ground speed of the spreader vehicle. In these systems, an automatic control system is used which opens and closes a hydraulic valve assembly to increase or decrease the speed of the conveyor and spinner based on the speed of the spreader vehicle traveling along the road. These automatic control systems usually include electric motors that have been adapted to manually open and close a valve stem in an amount proportional to the speed of the spreader vehicle.

More recent developments include the use of electronic or solenoid valve systems to control the spreader hydraulic valves. In these solenoid valve systems, solenoid valves are carried in a valve block specifically designed for these solenoid valves. The solenoid valve system is electronically connected to a control system to open and close the solenoid valves based on the spreader speed. These solenoid valve systems have the advantage over manual systems of adjusting the speed of the conveyor and spinner based on the spreader speed.

For the owners of the older, manually controlled spreader vehicles, it would be advantageous to replace the old manually controlled hydraulic valve system with a newer, electronically controlled hydraulic valve system. However, the cost and time involved in removing the manual valve system from the vehicle and replacing it with an electronically controlled valve system are prohibitive. The old manual valve block and associated manual valves must be removed and replaced in whole with the new valve block having the new electronically controlled valves. This means that the piping in the old system must generally be changed and reconfigured to engage the new valve block, which also adds to the cost of such a change. For most owners of older, manually controlled spreader vehicles, the costs involved in such a valve system change out are not economically practical.

There are electronic valves, such as solenoid valves, commercially available. Two types of solenoid valves in common use include simple open/close valves and pulse width modulated linear proportional throttling valves (PWM valves). The PWM valves are flow control valves which may or may not be pressure compensated. These individual PWM valves are generally available as "cartridge valves" in the industry.

A widely used example of such a cartridge valve is the DF122 series of valves manufactured by Parker Hannifin Corporation of Elyria, Ohio. A conventional Parker Hannifin Model DF122C14-20 cartridge valve (without a solenoid coil) is shown in FIG. 2 of the drawings. The cartridge valve 40 includes a valve body 42 and a movable, spring biased valve rod 44. A valve spool 46 is carried on the lower end of the valve rod 44. The spool 46 is substantially cylindrical in shape having a central, tapered region 50 with a plurality of holes 52 in the tapered region 50. The spool 46 is slidable within a valve sleeve 54 attached to the lower end of the valve body 42. The structure and operation of such a conventional cartridge valve will be readily understood by one of ordinary skill in the art.

It would be useful to be able to adapt a known cartridge valve, such as a DF122 series valve, to be used in the valve block of a conventional manual control valve, such as the 2F and QDB series valves, to convert a manually controlled hydraulic system to an electronically controlled hydraulic system. However, the conventional cartridge valves are typically too large or are of non-compatible configuration or design to fit into the valve cavities of the manual control valve blocks.

Therefore, it is an object of the invention to provide a valve adapter which can be used to adapt a commercially available cartridge valve, such as a series DF122 cartridge valve, to fit into the valve cavities of a manual hydraulic flow control valve, such as the 2F or QDB series manual control valves. It is also an object of the invention to provide a method of quickly and easily converting a manually controlled hydraulic valve system to an electronically controlled hydraulic valve system. It is further an object of the invention to provide a valve assembly for a hydraulic system having a cartridge valve, a valve block and an adapter connecting the cartridge valve to the valve block.

SUMMARY OF THE INVENTION

An adapter is provided for converting a manually controlled hydraulic valve system having at least one manual valve located in a valve block to an electronically controlled hydraulic valve system having a cartridge valve engaged with the valve block. The adapter includes a body having a first portion and a second portion with a passage extending through the body. First and second engagement regions are located in the first portion of the body. The second engagement region is configured to engage a cartridge valve having a valve rod and a valve spool. The first engagement region is configured to engage a cavity in the valve block to operationally connect the cartridge valve with the valve block.

A method is provided for converting a manually controlled hydraulic valve system having at least one manual valve located in a valve block to an electronically controlled hydraulic valve system having a cartridge valve engaged with the valve block. The manual valve is removed from the valve block and a cartridge valve is provided having a valve sleeve, a valve rod and a valve spool. The valve sleeve is removed from the cartridge valve and an adapter is attached to the cartridge valve such that the valve rod and the valve spool are slidable in the adapter. The adapter is inserted into the valve block and the cartridge valve is connected to an electronic control system to control the flow of fluid through the valve block.

A valve assembly is provided having a cartridge valve with a valve rod and a valve spool and an adapter having a body with a first portion, a second portion and a passage extending through the body. A plurality of fluid ports are located in the body and in flow communication with the passage. A first engagement region is located on the valve body and a second engagement region is located in the passage. The assembly further includes a valve block having at least one cavity. The second engagement region is configured to engage the cartridge valve such that the valve spool is slidable in the passage and the first engagement region is configured to engage the valve block to operationally attach the adapter and cartridge valve to the valve block.

A complete understanding of the invention will be obtained from the following description when taken in connection with the accompanying drawing figures wherein like reference numbers identify like parts throughout.

BRIEF DESCRIPTION OF THE DRAWINGS

FIG. 1 is a partially exploded view of a conventional 2F series hydraulic valve schematically shown in a manually controlled hydraulic valve system;

FIG. 3 is a side view of a valve adapter of the invention;

FIG. 4 is a side view of the valve adapter shown in FIG. 3 showing preferred dimensions (in inches) of the valve adapter;

FIG. 9 is a schematic view of the valve assembly of the invention mounted on a spreader vehicle; and FIG. 10 is a side, partially broken view of a conventional cartridge valve attached to an alternative embodiment of the valve adapter of the invention.

DESCRIPTION OF THE PREFERRED EMBODIMENTS

Figure 2:
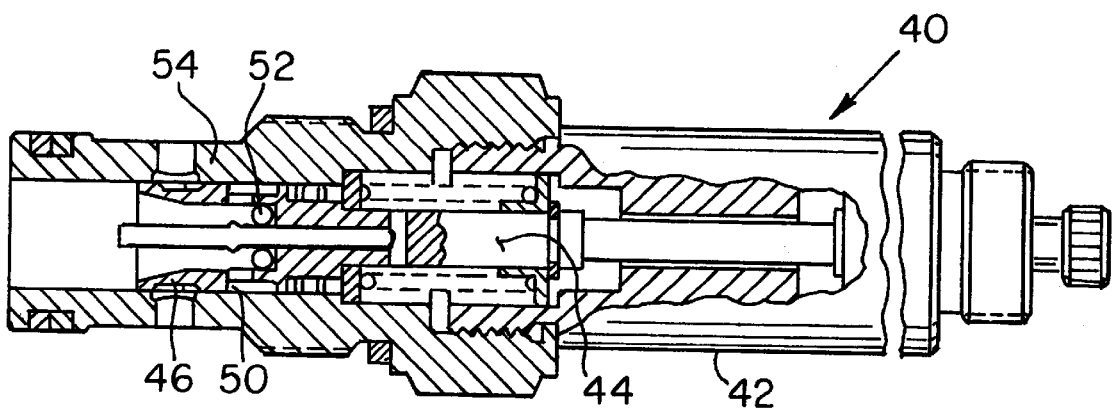
FIG. 2 is a side, partially broken view of a conventional DF122 series cartridge valve.

For purposes of the description hereinafter, the terms "upper", "lower", "right", "left", "vertical", "horizontal", "top", "bottom" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 5:
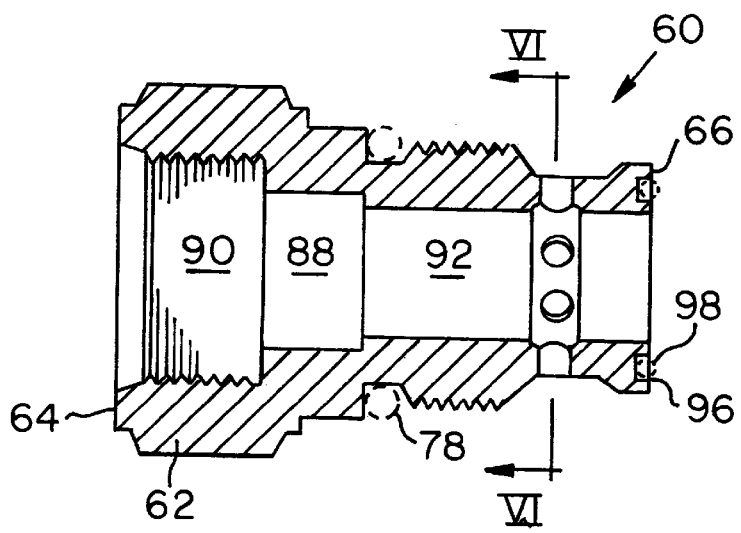
FIG. 5 is a sectional view of the valve adapter shown in FIG. 4 showing preferred dimensions (in inches) of the valve adapter.
Figure 6:
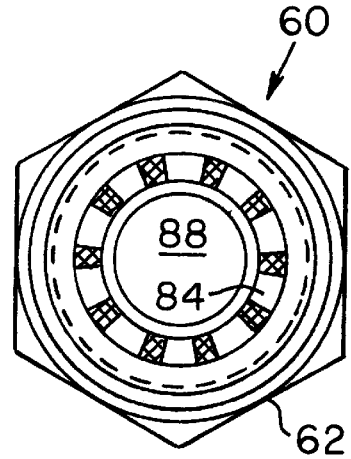
FIG. 6 is a sectional view of the valve adapter taken along the line VI—VI in FIG. 5.

An adapter of the invention is generally designated 60 in FIGS. 3–9 of the drawings. As shown in FIGS. 3–5, the adapter 60 includes a substantially cylindrical body 62 having a top 64 and a bottom 66. The body 62 is preferably made of metal, such as steel or other non-corrosive material. The body 62 has a stepped outer surface and further includes a first or upper region 68 and a second or lower region 70. A mating surface 72 extends annularly around the body 62 in the upper region 68. A first O-ring groove 76 extends annularly around the body 62 adjacent the mating surface 72 and a first O-ring 78 may be removably mounted in the first O-ring groove 76. A first engagement region 82, such as an externally threaded region, is located on the body 62 below the first O-ring groove 76.

The lower region 70 includes a plurality, preferably ten, fluid ports 84 spaced peripherally around the body 62. The fluid ports 84 are in flow communication with a passage 88 which extends through the body 62. As shown in FIG. 5 of the drawings, the passage 88 includes a second engagement region 90, such as an internally threaded cavity, located adjacent the top 64 of the body 62. The passage 88 further includes a valve spool channel 92 located below the second engagement region 90, with the ports 84 in flow communication with the valve spool channel 92. As shown in FIG. 5 of the drawings, the bottom 66 of the body 62 has a second O-ring groove 96 formed in the bottom surface. A second O-ring 98 may be removably mounted in the second O-ring groove 96.

The conversion of a manual valve system having a manual control valve, such as a 2F or QDB series valve, to an electronic system using the adapter 60 of the invention will now be described with particular reference to FIGS. 7–9 of the drawings. While the following discussion describes the use of a DF122 series cartridge valve, the same general procedure can be used with any conventional type of cartridge valve by appropriately adjusting the dimensions of the second engagement region 90 and spool channel 92.

The manual valves 16 are removed from the valve block 14 to provide access to the threaded valve cavities 22. The valve block 14 and all associated piping remain in place. The sleeve 54 of the conventional cartridge valve 40, such as a DF122 series valve, is removed, for example by unscrewing the sleeve 54 from the threaded lower region of the cartridge valve 40. The core of the cartridge valve 40, i.e., the rod 44, valve spool 46 and the cartridge valve body 42 are removed from the sleeve 54. The valve spool 46 and rod 44 are then inserted into the adapter 60 such that the spool 46 enters and is slidable in the spool channel 92. The adapter 60 of the invention is then attached to the bottom of the cartridge valve body 42 by inserting the bottom of the cartridge valve body 42 into the top 64 of the adapter 60 such that the external threads on the lower region of the cartridge valve body 42 engage the threads in the passage 88, particularly the second engagement region 90 of the adapter 60. The spool 46 extends into the passage 88 and is slidable in the valve spool channel 92.

Figure 7:
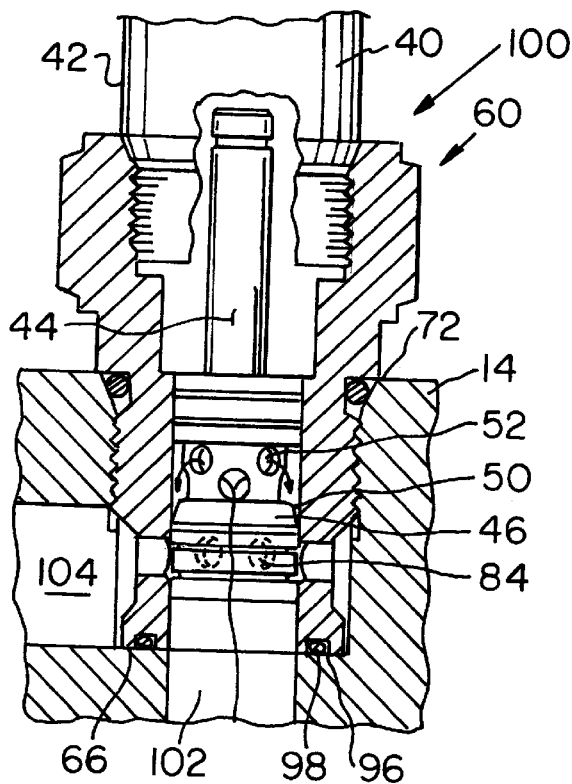
FIG. 7 is a side, sectional view of a valve assembly of the invention, with the valve assembly in a closed position.
Figure 8:
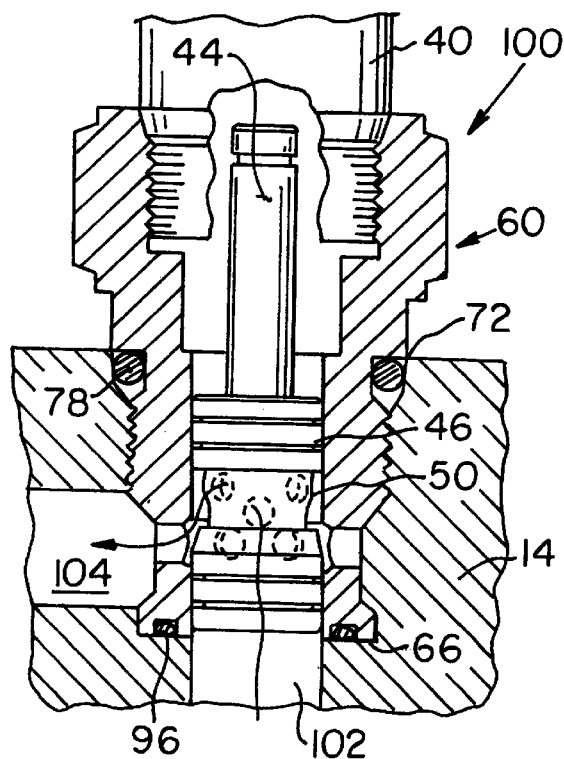
FIG. 8 is a side, sectional view of the valve assembly shown in FIG. 7, with the valve assembly in an open position.

As shown in FIGS. 7 and 8 of the drawings, the lower region 70 of the adapter 60 is then inserted into one of the cavities 22 of the valve block 14 and the threads of the first engagement region 82 engaged with the threads in the cavity 22. The cartridge valve body 42, adapter 60 and valve block 14 thus form a valve assembly 100. The first O-ring 78 contacts the side of the valve block cavity 22 and the mating surface 72 abuts the upper surface of the valve block 14 to engage the adapter 60 with the valve block 14.

The second O-ring 98 on the bottom 66 of the adapter 60 surrounds a fluid inlet channel 102 to direct fluid through the bottom of the spool 46 and into the passage 88 of the adapter 60. The bottom 66 of the adapter 60 abuts the bottom of the valve cavity 22 around the inlet channel 102. The ports 84 are in flow communication with a fluid outlet channel 104 in the valve block 14. In like manner, each of the manual valves 16 of the manually controlled hydraulic valve system 12 of a spreader can be replaced with a modified cartridge valve 40 and an adapter 60.

As shown in FIG. 9 of the drawings, the cartridge valves 40 can then be electronically connected to a conventional solenoid coil designed for the particular cartridge valve being used and an electronic control system 108, such as a Model ICS-2000 control system commercially available from Dickey-John Corporation of Auburn, Illinois. The electronic control system 108 may be configured to operate the cartridge valves 40 based on the speed of the spreader vehicle.

In the preferred embodiment of the adapter 60 described above, the sleeve of the conventional cartridge valve is removed and replaced by the adapter 60. However, as shown in FIG. 10 of the drawings, it is also within the scope of the invention to configure the adapter 60 such that the sleeve 120 of a conventional cartridge valve 122 does not have to be removed. In this embodiment, the second engagement region 90 of the adapter 60 is configured to engage the lower portion of the sleeve 120 and the passage 88 is configured such that the lower end of the sleeve 120 extends into the passage 88. The ports 84 on the adapter 60 can be aligned with the flow openings 124 on the sleeve or can be in flow communication with the sleeve flow openings 124 by a channel 126. The lower O-ring 128 on the sleeve 120 would abut the sidewall of the passage 88 to help seal the cartridge valve 122 in the adapter 60. The first engagement region 82 would be configured to engage the cavity in a manual flow control valve block, such as that of a 2F or QDB series valve.

Operation of the valve assembly 100 will now be described, particularly with respect to FIGS. 7 and 8 of the drawings. Hydraulic fluid flows through the fluid inlet channel 102 in the valve block 14 and is directed into the bottom 66 of the adapter 60. FIG. 7 of the drawings shows the valve assembly 100 in the closed position. In the closed position, the fluid flows upwardly into the bottom 66 of the adapter 60, through the bottom of the valve spool 46 and out of the valve spool holes 52 into the valve spool channel 92. However, since the lower portion of the valve spool 46 blocks the ports 84 in the lower region 70 of the adapter 60, the fluid is trapped in the valve spool channel 92 between the tapered region 50 of the valve spool 46 and the sidewall of the spool channel.

Upon receipt of an electronic signal from the control system 108, the rod 44 moves downwardly, which moves the valve spool 46 from the closed position shown in FIG. 7 of the drawings to the open position shown in FIG. 8 of the drawings. In the open position, the hydraulic fluid in the valve spool channel 92 is in flow communication with the ports 84 such that the hydraulic fluid now flows outwardly through the ports 84, through the fluid outlet channel 104 and then to the spinner or conveyor. The distance that the rod 44 and spool 46 move, and hence the amount of flow of hydraulic fluid out of the ports 84, is controlled by the electronic signal from the control system 108.

Thus, as shown in FIG. 9 of the drawings, a spreader vehicle 110 having a conventional manual control valve, such as a 2F or QDB series manual control valve, can be quickly and easily retrofitted with an electronic, solenoid cartridge valve 40 to convert the manual system to an automatic, electronic system. The valve block 14 of the conventional manual system does not have to be removed from the spreader vehicle nor does the existing piping have to be replaced or modified, which saves valuable time and money in retrofitting the spreader hydraulic system. Rather than retrofitting an already installed manual control valve, the adapter of the invention could be used to connect a cartridge valve to a conventional manual control valve block before installation in a spreader hydraulic system. Further, a kit can be provided to adapt or retrofit a manual control valve block system to an electronic or automatic control system. The kit preferably includes a conventional cartridge valve body with an adapter of the invention attached to the valve body. The rod and the valve spool of the cartridge valve are slidable in the adapter, as discussed above. Therefore, upon receipt of the kit, the owner of a spreader vehicle having a manually operated flow control system can simply replace the manual valves with the electronic valves of the kit. The kit may also include an electronic control system. Also, rather than modifying an existing conventional cartridge valve, the adapter of the invention can be manufactured and supplied as the sleeve of a cartridge valve such that the cartridge valve can simply be screwed into a manual flow control valve block, such as that of the 2F or QDB series valves.

It will readily be appreciated by those skilled in the art that modifications may be made to the invention without departing from the concepts disclosed in the foregoing description. Such modifications are to be considered as included within the following claims unless the claims, by their language, expressly state otherwise. Accordingly, the particular embodiments described in detail herein are illustrative only and are not limiting as to the scope of the invention which is to be given the full breadth of the appended claims and any and all equivalents thereof.

I claim:

1. An adapter for converting a manually controlled hydraulic valve system having at least one manual valve located in a valve block to an electronically controlled hydraulic valve system having a cartridge valve engaged with the valve block, the adapter comprising:

a body having a first portion and a second portion;

a passage extending through said body;

a first engagement region located on said body; and a second engagement region located on said body, wherein said second engagement region is configured to engage a cartridge valve body having a valve rod and a valve spool, and wherein said first engagement region is configured to engage a cavity in the valve block to operationally connect the cartridge valve body with the valve block.

2. The adapter as claimed in claim 1, wherein the adapter includes a spool channel and the valve spool is slidable in said spool channel.

3. The adapter as claimed in claim 1, wherein the adapter includes a stepped outer region having a first O-ring groove, with a first O-ring removably carried in said first O-ring groove.

4. The adapter as claimed in claim 1, wherein the adapter includes a bottom having an O-ring groove, with an O-ring removably carried in said O-ring groove.

5. The adapter as claimed in claim 1, wherein the adapter includes a plurality of fluid ports located in said second portion of said body, wherein said ports are in flow communication with said passage.

6. The adapter as claimed in claim 1, wherein said first engagement region is located in said first portion of said body.

7. The adapter as claimed in claim 1, wherein said second engagement region is located in said passage in said first portion of said body.

8. The adapter as claimed in claim 1, wherein said first engagement region is configured to engage the cavity of a 2F or QDB series valve block.

9. A method of converting a manually controlled hydraulic valve system having at least one manual valve located in a valve block to an electronically controlled hydraulic valve system having a cartridge valve engaged with the valve block, comprising the steps of:

removing the manual valve from the valve block;

providing a cartridge valve having a valve sleeve, a valve rod and a valve spool;

removing the valve sleeve from the cartridge valve;

attaching an adapter onto the cartridge valve such that the valve rod and valve spool are slidable in the adapter;

threadedly engaging the adapter with the valve block; and connecting the cartridge valve to an electronic control system to control the flow of fluid through the valve block.

10. The method as claimed in claim 9, wherein the adapter includes a first engagement region and the method includes engaging the first engagement region with a cavity in the valve block.

11. The method as claimed in claim 9, wherein the adapter includes a second engagement region and the method includes engaging the second engagement region with the cartridge valve.

12. The method as claimed in claim 9, wherein the adapter has a bottom with an O-ring carried in an O-ring groove and the valve block has a cavity with a fluid inlet channel, the method including inserting the adapter into the cavity such that the O-ring on the bottom of the adapter surrounds an opening of the fluid inlet channel.

13. The method as claimed in claim 9, wherein the manually controlled hydraulic valve system includes a 2F or QDB series flow control valve and the method includes inserting said adapter in the valve block of the 2F or QDB series flow control valve.

14. A valve assembly, comprising:

a cartridge valve body, a valve rod and a valve spool;

an adapter having a body with a first portion, a second portion and a passage extending through the adapter body;

a plurality of fluid ports located in said adapter body and in flow communication with said passage;

a first engagement region located on the adapter body;

a second engagement region located in said passage; and a valve block having at least one cavity, wherein said second engagement region is configured to engage the cartridge valve body such that the valve spool is slidable in the passage, and wherein the first engagement region is configured to engage the valve block to operationally attach the adapter and cartridge valve body to the valve block.

15. The assembly as claimed in claim 14, wherein the adapter includes a plurality of fluid ports and the spool is configured to move from a first position in which no fluid flow occurs through the fluid ports to a second position in which fluid is permitted to flow through the fluid ports.

16. The assembly as claimed in claim 14, wherein the body includes a first O-ring groove with a first O-ring located in the first O-ring groove and wherein the first O-ring is configured to abut the valve block.

17. The assembly as claimed in claim 14, wherein the body includes a bottom having an O-ring groove with an O-ring removably carried in the O-ring groove.

18. The assembly as claimed in claim 14, including an electronic control system connected to the cartridge valve body.

19. The assembly as claimed in claim 14, wherein the valve block is that of a 2F or QDB flow control valve.

* * * * *